(12) United States Patent
Kook et al.

(10) Patent No.: US 9,791,021 B2
(45) Date of Patent: Oct. 17, 2017

(54) TRANSMISSION FOR VEHICLE

(71) Applicant: Hyundai Motor Company, Seoul (KR)

(72) Inventors: Jae Chang Kook, Hwaseong-si (KR); Kang Soo Seo, Yongin-si (KR); Won Min Cho, Hwaseong-si (KR); Myeong Hoon Noh, Seongnam-si (KR); Seong Wook Ji, Ansan-si (KR); Wook Jin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/886,308

(22) Filed: Oct. 19, 2015

(65) Prior Publication Data

US 2016/0363189 A1 Dec. 15, 2016

(30) Foreign Application Priority Data

Jun. 9, 2015 (KR) .................. 10-2015-0081500

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| 7,993,235 B2 | 8/2011 | Wittkopp et al. | |
| 2011/0009229 A1* | 1/2011 | Bauknecht | F16H 3/66 475/275 |

FOREIGN PATENT DOCUMENTS

| DE | 102009028736 | * 2/2011 | ............... F16H 3/66 |
| JP | 2013-199959 A | 10/2013 | |
| KR | 2013-0003981 A | 1/2013 | |
| KR | 10-2014-0101859 A | 8/2014 | |
| KR | 10-1509726 B1 | 4/2015 | |

\* cited by examiner

*Primary Examiner* — Erin D Bishop
(74) *Attorney, Agent, or Firm* — Morgan, Lewis & Bockius LLP

(57) ABSTRACT

A transmission for a vehicle may include an input shaft, an output shaft, a first planetary gear set, a second planetary gear set, a third, planetary gear set, a fourth planetary gear set, provided to transfer a torque between the input shaft and the output shaft, and friction members, wherein each of the first, second, third, and fourth planetary gear sets includes three rotary elements and three of the friction members are each selectively connected to at least one of the at least three rotary elements of the first, second, third, and fourth planetary gear sets and control rotation of the rotary elements to achieve gear ratios of ten or more steps of forward shifting and one step of reverse shifting in a vehicle.

10 Claims, 2 Drawing Sheets

FIG. 2

| GEAR | C1 | C2 | C3 | C4 | C5 | C6 | Gear ratio |
|------|----|----|----|----|----|----|------------|
| 1ST  |    | ○  | ○  |    | ○  |    | 5.000 |
| 2ND  |    |    | ○  |    | ○  | ○  | 2.027 |
| 3RD  |    |    | ○  | ○  |    | ○  | 1.987 |
| 4TH  |    | ○  | ○  |    |    | ○  | 1.816 |
| 5TH  |    | ○  |    | ○  | ○  |    | 1.482 |
| 6TH  |    | ○  |    |    | ○  | ○  | 1.388 |
| 7TH  |    | ○  |    | ○  |    | ○  | 1.000 |
| 8TH  | ○  | ○  |    |    |    | ○  | 0.796 |
| 9TH  | ○  |    |    | ○  |    | ○  | 0.753 |
| 10TH | ○  |    |    |    | ○  | ○  | 0.505 |
| REV  | ○  | ○  |    |    | ○  |    | -3.600 |

TRANSMISSION FOR VEHICLE

CROSS REFERENCE TO RELATED APPLICATION

The present application claims priority to Korean Patent Application Number 10-2015-0081500 filed Jun. 9, 2015, the entire contents of which application is incorporated herein for all purposes by this reference.

BACKGROUND OF THE INVENTION

Field of the Invention

The present invention relates to a transmission for a vehicle that can improve fuel efficiency by implementing multiple steps of shifting and improve vehicle driving comfort by using operating points in a low RPM range of an engine.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As for an automatic transmission, there are various methods of improving fuel efficiency, and operability and competitiveness in fuel efficiency can both be secured by implementing multiple steps of shifting.

However, when the shift ranges increase, the number of parts in an automatic transmission also increases, so the automatic transmission may be difficult to mount, the manufacturing cost and weight may be increased, and power transmission efficiency may be deteriorated.

Accordingly, in order to increase the effect of improving fuel efficiency through multiple steps of shifting, it may be important to develop a gear train structure that can achieve maximum efficiency with fewer parts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that can improve fuel efficiency by implementing multiple steps of shifting and improve vehicle driving comfort by using operating points in a low RPM range of an engine.

According to various aspects of the present invention, a transmission for a vehicle may include a first planetary gear set, a second planetary gear set, a third, planetary gear set, and a fourth planetary gear set each including three rotary elements, and a plurality of friction members, in which the first planetary gear set may include a first rotary element connected to an input shaft, a second rotary element operating as a selectively-fixed element and selectively connected with a third rotary element of the second planetary gear set and a first rotary element of the fourth planetary gear set, and a third rotary element selectively connected with a second rotary element of the second planetary gear set, the second planetary gear set may include a first rotary element selectively connected with the first rotary element of the fourth planetary gear set, and the second rotary element selectively connected with a first rotary element of the third planetary gear set, the third planetary gear set may includes the first rotary element selectively connected with the third rotary element of the second planetary gear set, a second rotary element connected to the input shaft, and a third rotary element connected to an output shaft, the fourth planetary gear set may include a second rotary element connected to the output shaft and a third rotary element operating as a fixed element, and the friction members may be connected to at least one of the rotary elements of the planetary gear sets and control rotation of the rotary elements.

In the first planetary gear set, the first rotary element may be a first sun gear, the second rotary element may be a first carrier, and the third rotary element may be a first ring gear, in the second planetary gear set, the first rotary element may be a second sun gear, the second rotary element may be a second carrier, and the third rotary element may be a second ring gear, in the third planetary gear set, the first rotary element may be a third sun gear, the second rotary element may be a third carrier, and the third rotary element may be a third ring gear, and in the fourth planetary gear set, the first rotary element may be a fourth sun gear, the second rotary element may be a fourth carrier, and the third rotary element may be a fourth ring gear.

The second rotary element of the first planetary gear set may be connected to and disconnected from a transmission case by a first clutch, the second rotary element of the first planetary gear set and the third rotary element of the second planetary gear set may be connected to and disconnected from each other by a second clutch, and the second rotary element of the first planetary gear set and the first rotary element of the fourth planetary gear set may be connected to and disconnected from a third clutch.

The first rotary element of the second planetary gear set and the first rotary element of the fourth planetary gear set may be connected to and disconnected from each other by a fifth clutch, and the second rotary element of the second planetary gear set and the first rotary element of the third planetary gear set may be connected to and disconnected from each other by a fourth clutch.

The first rotary element of the third planetary gear set and the third rotary element of the second planetary gear set may be connected to and disconnected from each other by a sixth clutch.

The third rotary element of the fourth planetary gear set may be directly connected to a transmission case.

The first planetary gear set, the second planetary gear set, the third planetary gear set, and the fourth planetary gear set may be sequentially arranged in an axial direction.

The friction members may include a first clutch disposed for connecting and disconnecting the second rotary element of the first planetary gear set and a transmission case, a second clutch disposed for connecting and disconnecting the second rotary element of the first planetary gear set and the third rotary element of the second planetary gear set, a third clutch disposed for connecting and disconnecting the second rotary element of the first planetary gear set and the first rotary element of the fourth planetary gear set, a fourth clutch disposed for connecting and disconnecting the second rotary element of the second planetary gear set and the first rotary element of the third planetary gear set, a fifth clutch disposed for connecting and disconnecting the first rotary element of the second planetary gear set and the first rotary element of the fourth planetary gear set, and a sixth clutch disposed for connecting and disconnecting the first rotary element of the third planetary gear set and the third rotary element of the second planetary gear set.

According to various aspects of the present invention, a transmission for a vehicle may include a first planetary gear set, a second planetary gear set, a third planetary gear set, and a fourth planetary gear set each including three rotary elements, an input shaft connected to a first rotary element of the first planetary gear set and a second rotary element of the third planetary gear set, a first shaft connecting a second rotary element of the first planetary gear set, a first clutch, a second clutch, and a third clutch, a second shaft connecting a third rotary element of the first planetary gear set, a second rotary element of the second planetary gear set, and a fourth clutch, a third shaft connecting a first rotary element of the second planetary gear set and a fifth clutch, a fourth shaft connecting a third rotary element of the second planetary gear set, the second clutch, and a sixth clutch, a fifth shaft connecting a first rotary element of the third planetary gear set, the fourth clutch, and the sixth clutch, a sixth shaft connecting a first rotary element of the fourth planetary gear set, the third clutch, and the fifth clutch, an output shaft connecting a third rotary element of the third planetary gear set and a second rotary element of the fourth planetary gear set, and a transmission case connected with a third rotary element of the fourth planetary gear set and the first clutch.

The first clutch may be disposed for connecting and disconnecting the first shaft and the transmission case, the second clutch may be disposed for connecting and disconnecting the first shaft and the fourth shaft, the third clutch may be disposed for connecting and disconnecting the first shaft and the sixth shaft, the fourth clutch may be disposed for connecting and disconnecting the second shaft and the fifth shaft, the fifth clutch may be disposed for connecting and disconnecting the third shaft and the sixth shaft, and the sixth clutch may be disposed for connecting and disconnecting the fourth shaft and the fifth shaft.

The first clutch may be disposed for connecting and disconnecting the second rotary element of the first planetary gear set and the transmission case, the second clutch may be disposed for connecting and disconnecting the second rotary element of the first planetary gear set and the third rotary element of the second planetary gear set, the third clutch may be disposed for connecting and disconnecting the second rotary element of the first planetary gear set and the first rotary element of the fourth planetary gear set, the fourth clutch may be disposed for connecting and disconnecting the second rotary element of the second planetary gear set and the first rotary element of the third planetary gear set, the fifth clutch may be disposed for connecting and disconnecting the first rotary element of the second planetary gear set and the first rotary element of the fourth planetary gear set, and the sixth clutch may be disposed for connecting and disconnecting the first rotary element of the third planetary gear set and the third rotary element of the second planetary gear set.

As described above, since the rotary elements of the first, second, third, and fourth planetary gear sets are selectively connected/disconnected by a plurality of clutches, their rotational speeds and directions are changed and shifting is performed accordingly. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation in each range by an exemplary transmission for a vehicle according to the present invention.

Figure 1:
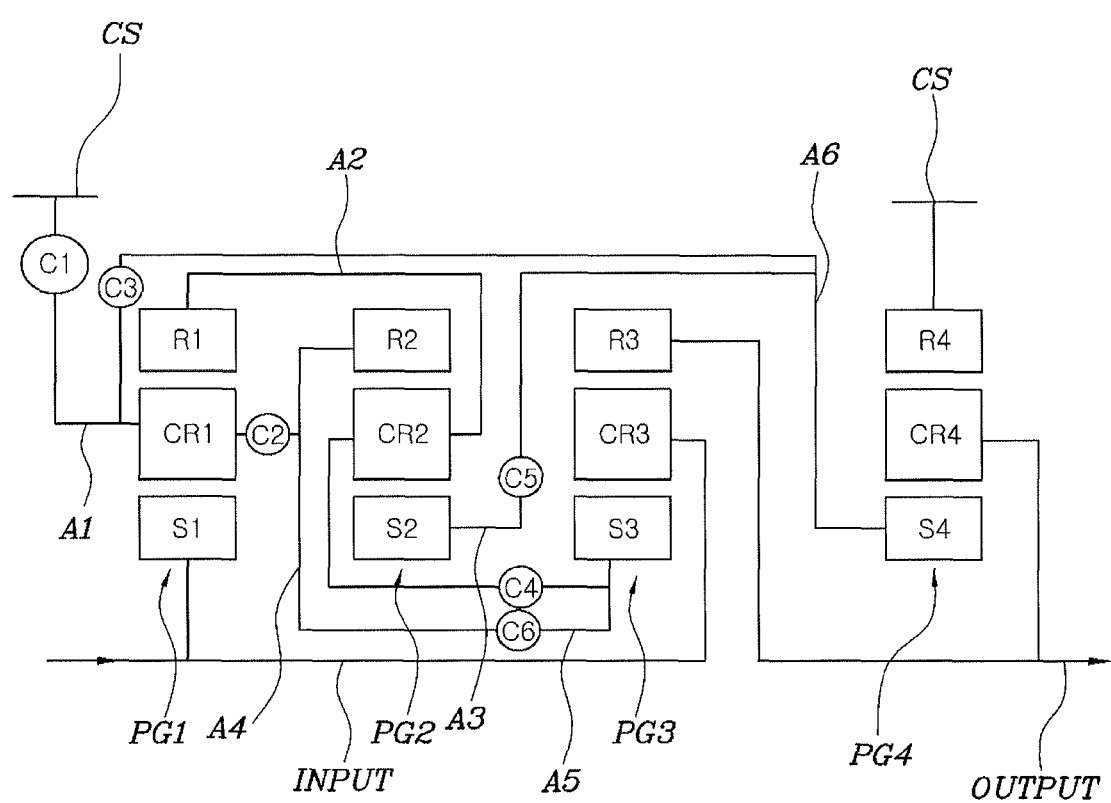
FIG. 1 is a diagram schematically showing the structure of an exemplary transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for a vehicle according to various embodiments of the present invention largely include a first planetary gear set PG1, a second planetary gear set PG2, a third planetary gear set PG3, and a fourth planetary gear set PG4, and the planetary gear sets each may include three rotary elements, that is, first, second, and third rotary elements.

Referring to FIG. 1, the first rotary element of the first planetary gear set PG1 may operate as an input element by being connected to an input shaft INPUT. For example, the first rotary element of the first planetary gear set PG1 may be a first sun gear S1 and the first sun gear S1 may operate as a constant input element by being directly connected to the input shaft INPUT.

The second rotary element of the first planetary gear set PG1 may operate as a selectively-fixed element. For example, the second rotary element of the first planetary gear set PG1 may be a first carrier CR1 and the first carrier CR1 can be connected/disconnected to/from a transmission case CS by a friction member to be able to operate as a selectively-fixed element.

The second rotary element of the first planetary gear set PG1 may be selectively connected with the third rotary element of the second planetary gear set PG2. For example, the third rotary element of the second planetary gear set PG2 may be a second ring gear R2, and the first carrier CR1 and the second ring gear R2 can be connected/disconnected to/from each other by a friction member.

The second rotary element of the first planetary gear set PG1 may be selectively connected with the first rotary element of the fourth planetary gear set PG4. For example, the first rotary element of the fourth planetary gear set PG4 may be a fourth sun gear S4, and the first carrier CR1 and the fourth sun gear S4 can be connected/disconnected to/from each other by a friction member.

The third rotary element of the first planetary gear set PG1 may be connected with the second rotary element of the second planetary gear set PG2. For example, the third rotary element of the first planetary gear set PG1 may be a first ring gear R1 and the second rotary element of the second planetary gear set PG2 may be a second carrier CR2, so the first ring gear R1 and the second carrier CR2 can be connected to each other. The first ring gear R1 and the second carrier CR2 may be connected directly to each other.

The first rotary element of the second planetary gear set PG2 may be selectively connected with the first rotary element of the fourth planetary gear set PG4. For example, the first rotary element of the second planetary gear set PG2 may be a second sun gear S2 and the first rotary element of the fourth planetary gear set PG4 may be a fourth sun gear S4, so the second sun gear S2 and the fourth sun gear S4 can be connected/disconnected to/from each other by a friction member.

The second rotary element of the second planetary gear set PG2 may be selectively connected with the first rotary element of the third planetary gear set PG3. For example, the first rotary element of the third planetary gear set PG3 may be a third sun gear, and the second carrier CR2 and the third sun gear S3 can be connected/disconnected to/from each other by a friction member.

The first rotary element of the third planetary gear set PG3 may be selectively connected with the third rotary element of the second planetary gear set PG2. For example, the first rotary element of the third planetary gear set PG3 may be a third sun gear S3 and the third rotary element of the second planetary gear set PG2 may be a second ring gear R2, so the third sun gear S3 and the second ring gear R2 can be connected/disconnected to/from each other by a friction member.

The second rotary element of the third planetary gear set PG3 may be connected to an input shaft INPUT. For example, the second rotary element of the third planetary gear set PG3 may be a third carrier CR3 and the third carrier CR3 may operate as a constant input element by being directly connected to the input shaft INPUT.

The third rotary element of the third planetary gear set PG3 may operate as an output element by being connected to an output shaft OUTPUT. For example, the third rotary element of the third planetary gear set PG3 may be a third ring gear R3 and the third ring gear R3 may operate as a constant output element by being directly connected to the output shaft OUTPUT The second rotary element of the fourth planetary gear set PG4 may also operate as an output element by being connected to an output shaft OUTPUT. For example, the second rotary element of the fourth planetary gear set PG4 may be a fourth carrier CR4 and the fourth carrier CR4 may operate as a constant output element by being directly connected to the output shaft OUTPUT.

The third rotary element of the fourth planetary gear set PG4 may operate as a fixed element. For example, the third rotary element of the fourth planetary gear set PG4 may be a fourth ring gear R4 and the fourth ring gear R4 may operate as a constant fixed element by being directly connected to the transmission case CS.

In the present invention, the first planetary gear set PG1, second planetary gear set PG2, third planetary gear set PG3, and fourth planetary gear set PG4 may be sequentially arranged in the axial direction of the input shaft INPUT and the output shaft OUTPUT. Further, all of the first planetary gear set PG1, second planetary gear set PG2, third planetary gear set PG3, and fourth planetary gear set PG4 may be single pinion planetary gear sets.

The present invention may further include a plurality of friction members connected to at least one or more of the rotary elements of the planetary gear sets and controlling rotation of the rotary elements. The friction members may be first clutch C1 to sixth clutch C6.

In detail, the first clutch C1 may be disposed for connecting/disconnecting the first carrier CR1, which is the second rotary element of the first planetary gear set PG1, and the transmission case CS.

The second clutch C2 may be disposed for connecting/disconnecting the first carrier CR1 that is the second rotary element of the first planetary gear set PG1 and the second ring gear R2 that is the third rotary element of the second planetary gear set PG3.

The third clutch C3 may be disposed for connecting/disconnecting the first carrier CR1 that is the second rotary element of the first planetary gear set PG1 and the fourth sun gear S4 that is the first rotary element of the fourth planetary gear set PG4.

The fourth clutch C4 may be disposed for connecting/disconnecting the second carrier CR2 that is the second rotary element of the second planetary gear set PG2 and the third sun gear S3 that is the first rotary element of the third planetary gear set PG3.

The fifth clutch C5 may be disposed for connecting/disconnecting the second sun gear S2 that is the first rotary element of the second planetary gear set PG2 and the fourth sun gear S4 that is the first rotary element of the fourth planetary gear set PG4.

The fourth clutch C6 may be disposed for connecting/disconnecting the third ring gear R3 that is the third rotary element of the third planetary gear set PG3 and the second ring gear S2 that is the third rotary element of the second planetary gear set PG2.

On the other hand, the rotary elements of the planetary gear sets may be connected through the input shaft INPUT, a first shaft A1 to an eighth shaft A8, and the output shaft OUTPUT.

Referring to FIG. 1, the first rotary element of the first planetary gear set PG1 and the second rotary element of the third planetary gear set PG3 may be directly connected to the input shaft INPUT.

The second rotary element of the first planetary gear set PG1, a first side of the first clutch C1, a first side of the second clutch C2, and a first side of the third clutch C3 may be connected to the first shaft A1.

The third rotary element of the first planetary gear set PG1, the second rotary element of the second planetary gear set PG2, and a first side of the fourth clutch C4 may be connected to the second shaft A2.

The first rotary element of the second planetary gear set PG2 and a first side of the fifth clutch C5 may be connected to the third shaft A3.

The third rotary element of the second planetary gear set PG2, a second side of the second clutch C2, and a first side of the sixth clutch C6 may be connected to the fourth shaft A4.

The first rotary element of the third planetary gear set PG3, a second side of the fourth clutch C4, and a second side of the sixth clutch C6 may be connected to the fifth shaft A5.

The first rotary element of the fourth planetary gear set PG4, a second side of the third clutch C3, and a second side of the fifth clutch C5 may be connected to the sixth shaft A6.

The third rotary element of the third planetary gear set PG3 and the second rotary element of the fourth planetary gear set PG4 may be connected to the output shaft OUTPUT.

The third rotary element of the fourth planetary gear set PG4 and a second side of the first clutch C1 may be connected to the transmission case CS.

For example, the first clutch C1 may be disposed for connecting/disconnecting the first shaft A1 and the transmission case CS, the second clutch C2 may be disposed for connecting/disconnecting first shaft A1 and the fourth shaft A4, and the third clutch C3 may be disposed for connecting/disconnecting the first shaft A1 and the sixth shaft A6.

Further, the fourth clutch C4 may be disposed for connecting/disconnecting the second shaft A2 and the fifth shaft A5, the fifth clutch C5 may be disposed between the third shaft A3 and the sixth shaft A6, and the sixth clutch C6 may be disposed for connecting/disconnecting the fourth shaft A4 and the fifth shaft A5.

FIG. 2 is a table showing operation in each range by a transmission for a vehicle according to various embodiments of the present invention, in which, for example, in order to implement a 1-range gear ratio, the second clutch C2, third clutch C3, and fifth clutch C5 may be connected and all other friction members may be disconnected.

In order to implement a 2-range gear ratio, the second clutch C3, fifth clutch C5, and sixth clutch C6 may be connected and all other friction members may be disconnected. Further, as for the other ranges, a vehicle can be driven with the gear ratios corresponding to the ranges by connecting/disconnecting, as shown in the table.

As described above, since the rotary elements of the first, second, third, and fourth planetary gear sets PG1, PG2, PG3, and PG4 are selectively connected/disconnected by a plurality of clutches, their rotational speeds and directions are changed and shifting is performed accordingly. Therefore, a vehicle can be driven with the gear ratios of ten or more steps of forward shifting and one step of reverse shifting. Therefore, it is possible improve fuel efficiency by implementing multiple steps of shifting and improve vehicle driving comfort by using operating points in a low RPM range of an engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
a first planetary gear set, a second planetary gear set, a third, planetary gear set, and a fourth planetary gear set; and
friction members,
wherein the first planetary gear set includes: a first rotary element of the first planetary gear set directly connected to an input shaft; a second rotary element of the first planetary gear set operating as a selectively-fixed element by a first friction member of the friction members and selectively connected with a third rotary element of the second planetary gear set by a second friction member of the friction members and selectively connected with a first rotary element of the fourth planetary gear set by a third friction member of the friction members; and a third rotary element of the first planetary gear set directly connected with a second rotary element of the second planetary gear set,
the second planetary gear set includes: a first rotary element of the second planetary gear set being rotatable relative to a transmission case and selectively connected with the first rotary element of the fourth planetary gear set by a fifth friction member of the friction members; and the second rotary element of the second planetary gear set selectively connected with a first rotary element of the third planetary gear set,
the third planetary gear set includes: the first rotary element of the third planetary gear set selectively connected with the third rotary element of the second planetary gear set by a sixth friction member of the friction members; a second rotary element of the third planetary gear set directly connected to the input shaft; and a third rotary element of the third planetary gear set directly connected to an output shaft,
the fourth planetary gear set includes: a second rotary element of the fourth planetary gear set directly connected to the output shaft and a third rotary element operating of the fourth planetary gear set as a fixed element.

2. The transmission of claim 1, wherein in the first planetary gear set, the first rotary element is a first sun gear, the second rotary element is a first carrier, and the third rotary element is a first ring gear,
in the second planetary gear set, the first rotary element is a second sun gear, the second rotary element is a second carrier, and the third rotary element is a second ring gear,
in the third planetary gear set, the first rotary element is a third sun gear, the second rotary element is a third carrier, and the third rotary element is a third ring gear, and
in the fourth planetary gear set, the first rotary element is a fourth sun gear, the second rotary element is a fourth carrier, and the third rotary element is a fourth ring gear.

3. The transmission of claim 2, wherein the second rotary element of the first planetary gear set is connected to and disconnected from the transmission case by a first clutch which is the first friction member of the friction members,
the second rotary element of the first planetary gear set and the third rotary element of the second planetary gear set are connected to and disconnected from each other by a second clutch which is the second friction member of the friction members, and the second rotary element of the first planetary gear set and the first rotary element of the fourth planetary gear set are connected to and disconnected from a third clutch which is the third friction member of the friction members.

4. The transmission of claim 2, wherein the first rotary element of the second planetary gear set and the first rotary element of the fourth planetary gear set are connected to and disconnected from each other by a fifth clutch which is the fifth friction member of the friction members, and the second rotary element of the second planetary gear set and the first rotary element of the third planetary gear set are connected to and disconnected from each other by a fourth clutch which is a fourth friction member of the friction members.

5. The transmission of claim 2, wherein the first rotary element of the third planetary gear set and the third rotary element of the second planetary gear set are connected to and disconnected from each other by a sixth clutch which is the sixth friction member of the friction members.

6. The transmission of claim 2, wherein the third rotary element of the fourth planetary gear set is directly connected to the transmission case.

7. The transmission of claim 2, wherein the first planetary gear set, the second planetary gear set, the third planetary gear set, and the fourth planetary gear set are sequentially arranged in an axial direction.

8. The transmission of claim 1, wherein the friction members include:
a first clutch disposed for connecting and disconnecting the second rotary element of the first planetary gear set and the transmission case, the first friction member being the first clutch;
a second clutch disposed for connecting and disconnecting the second rotary element of the first planetary gear set and the third rotary element of the second planetary gear set, the second friction being the second clutch;
a third clutch disposed for connecting and disconnecting the second rotary element of the first planetary gear set and the first rotary element of the fourth planetary gear set, the third friction member being the third clutch;
a fourth clutch disposed for connecting and disconnecting the second rotary element of the second planetary gear set and the first rotary element of the third planetary gear set, a fourth friction member of the friction members being the fourth clutch;
a fifth clutch disposed for connecting and disconnecting the first rotary element of the second planetary gear set and the first rotary element of the fourth planetary gear set, the fifth friction member being the fifth clutch; and
a sixth clutch disposed for connecting and disconnecting the first rotary element of the third planetary gear set and the third rotary element of the second planetary gear set, the sixth friction member being the sixth clutch.

9. A transmission for a vehicle, comprising:
a first planetary gear set, a second planetary gear set, a third planetary gear set, and a fourth planetary gear set;
an input shaft directly connected to a first rotary element of the first planetary gear set and a second rotary element of the third planetary gear set;
a first shaft directly connecting a second rotary element of the first planetary gear set, a first clutch, a second clutch, and a third clutch;
a second shaft directly connecting a third rotary element of the first planetary gear set, a second rotary element of the second planetary gear set, and a fourth clutch;
a third shaft directly connecting a first rotary element of the second planetary gear set and a fifth clutch;
a fourth shaft directly connecting a third rotary element of the second planetary gear set, the second clutch, and a sixth clutch;
a fifth shaft directly connecting a first rotary element of the third planetary gear set, the fourth clutch, and the sixth clutch;
a sixth shaft directly connecting a first rotary element of the fourth planetary gear set, the third clutch, and the fifth clutch;
an output shaft directly connecting a third rotary element of the third planetary gear set and a second rotary element of the fourth planetary gear set; and
a transmission case connected with a third rotary element of the fourth planetary gear set and the first clutch,
wherein the first clutch is disposed for connecting and disconnecting the first shaft and the transmission case,
wherein the second clutch is disposed for connecting and disconnecting the first shaft and the fourth shaft,
wherein the third clutch is disposed for connecting and disconnecting the first shaft and the sixth shaft,
wherein the fourth clutch is disposed for connecting and disconnecting the second shaft and the fifth shaft,
wherein the fifth clutch is disposed for connecting and disconnecting the third shaft and the sixth shaft, and
wherein the sixth clutch is disposed for connecting and disconnecting the fourth shaft and the fifth shaft.

10. The transmission of claim 9, wherein the first clutch is disposed for connecting and disconnecting the second rotary element of the first planetary gear set and the transmission case,
the second clutch is disposed for connecting and disconnecting the second rotary element of the first planetary gear set and the third rotary element of the second planetary gear set,
the third clutch is disposed for connecting and disconnecting the second rotary element of the first planetary gear set and the first rotary element of the fourth planetary gear set,
the fourth clutch is disposed for connecting and disconnecting the second rotary element of the second planetary gear set and the first rotary element of the third planetary gear set,
the fifth clutch is disposed for connecting and disconnecting the first rotary element of the second planetary gear set and the first rotary element of the fourth planetary gear set, and
the sixth clutch is disposed for connecting and disconnecting the first rotary element of the third planetary gear set and the third rotary element of the second planetary gear set.

* * * * *